(12) United States Patent
Valenzky, Jr. et al.

(10) Patent No.: US 6,874,409 B2
(45) Date of Patent: Apr. 5, 2005

(54) METHOD AND APPARATUS FOR MAKING COMMERCIAL CRUSTLESS SANDWICHES AND THE CRUSTLESS SANDWICH MADE THEREBY

(75) Inventors: Robert John Valenzky, Jr., Akron, OH (US); Duane Nathan Eberhart, Wooster, OH (US)

(73) Assignee: The J. M. Smucker Company, Orrville, OH (US)

( * ) Notice: Subject to any disclaimer, the term of this patent is extended or adjusted under 35 U.S.C. 154(b) by 0 days.

(21) Appl. No.: 10/803,240

(22) Filed: Mar. 18, 2004

(65) Prior Publication Data

US 2004/0180115 A1 Sep. 16, 2004

Related U.S. Application Data

(62) Division of application No. 10/331,031, filed on Dec. 27, 2002, which is a continuation of application No. 09/797,553, filed on Mar. 2, 2001, now abandoned.

(51) Int. Cl.[7] .............................. A23L 1/00; A23L 1/31; A21C 9/04; A21C 15/00
(52) U.S. Cl. ..................... 99/450.4; 99/450.1; 99/450.5
(58) Field of Search .............................. 99/450.4, 450.5, 99/450.6, 450.7, 450.8, 450.1, 450.2, 450.3, 494, 516, 537, 538, 484, 485; 426/94, 275, 297, 138, 274

(56) References Cited

U.S. PATENT DOCUMENTS

| | | | |
|---|---|---|---|
| 2,718,198 A | * | 9/1955 | Bayley ..................... 99/450.5 |
| 2,765,755 A | | 10/1956 | Napolillo |
| 2,780,163 A | | 2/1957 | Lee |
| 3,044,883 A | | 7/1962 | Ferguson |

(Continued)

FOREIGN PATENT DOCUMENTS

AU       A-40334/95       6/1996

OTHER PUBLICATIONS

Letter Dated May 5, 2000.
Selected Excerpts From a Book *Pasta, Pies and Pasteries—Tart Recipes From Around the World*, Authored by Ursula Kaiser, undated.

OTHER PUBLICATIONS

*Primary Examiner*—Timothy F. Simone
(74) *Attorney, Agent, or Firm*—Fay, Sharpe, Fagan,; Brian E. Turung; Robert V. Vickers

(57) ABSTRACT

A method of making a crustless sandwich from two slices of bread with outer crusts, the method comprising: placing a first slice of bread on a platen; forming a mass of a first food spread onto the central portion of the first slice of bread in a position spaced inwardly from a marginal area where the mass is formed with an inner lower layer with an outer rim extending upwardly from the lower layer to define a closed pocket or receptacle recess in the mass; placing a second food spread in the receptacle recess; closing the receptacle recess with a layer of the first food spread generally coextensive with the mass and supported on the outer rim of the mass to encapsulate the second food spread into a center composite food layer; placing a second slice of bread over the first slice to cover the center composite food layer; cutting the bread slices in unison in a cut pattern to remove the crusts of the slices; and, pressing the two bread slices together by force through the slices against a pressure surface on the platen to crimp the slices into a crustless sandwich.

31 Claims, 8 Drawing Sheets

U.S. PATENT DOCUMENTS

| | | | |
|---|---|---|---|
| 3,083,651 A | | 4/1963 | Cooper |
| 3,095,832 A | | 7/1963 | Evans |
| 3,111,914 A | | 11/1963 | Viviano |
| 3,182,611 A | | 5/1965 | Rubenstein |
| 3,343,504 A | * | 9/1967 | Hermann .................... 99/450.4 |
| 3,690,898 A | | 9/1972 | Partyka |
| 3,767,823 A | | 10/1973 | Wheeler et al. |
| 3,769,035 A | | 10/1973 | Kleiner et al. |
| 3,782,270 A | * | 1/1974 | Sollerud .................... 99/450.4 |
| 3,783,772 A | * | 1/1974 | Fay ........................... 99/450.4 |
| 3,862,344 A | | 1/1975 | Zobel |
| 4,094,236 A | * | 6/1978 | Holmes et al. ............ 99/450.4 |
| 4,154,157 A | * | 5/1979 | Chenevard et al. ........ 99/450.4 |
| D252,536 S | | 8/1979 | Goglanian |
| 4,382,768 A | | 5/1983 | Lifshitz et al. |
| 4,513,656 A | * | 4/1985 | Fay ........................... 99/450.4 |
| 4,537,121 A | * | 8/1985 | Bero et al. ................. 99/450.4 |
| D293,040 S | | 12/1987 | Gagliardi |
| D317,672 S | | 6/1991 | Presl |
| D318,360 S | | 7/1991 | Sam |
| 5,359,925 A | * | 11/1994 | Forker ....................... 99/450.8 |
| 5,365,835 A | * | 11/1994 | Naramura ................... 99/450.5 |
| 5,493,958 A | * | 2/1996 | Naramura ................... 99/450.5 |
| 5,500,234 A | | 3/1996 | Russo |
| 5,540,141 A | * | 7/1996 | Grubzak .................... 99/450.4 |
| 5,567,454 A | | 10/1996 | Bogdan |
| 5,853,778 A | | 12/1998 | Mayfield |

OTHER PUBLICATIONS

Selected Excerpts from *The Pampered Chef*, undated.

A Recipe and Instruction Book Entitled *The Pampered Chef*, undated.

Complaint Filed by Albie's Foods, Inc. Against Menusaver, Inc., Filed on Jan. 11, 2001.

"50 Great Sandwiches" Carole Handslip, pp. 81–84, 86, 95, 1994.

Excerpt from *The Wichita Eagle*, City Edition, Living Section, p. 1C, Aug. 14, 1994.

Excerpt from Editorial by E.S. Baughman, State–Record Co., Columbia, South Carolina, 1991.

* cited by examiner

METHOD AND APPARATUS FOR MAKING COMMERCIAL CRUSTLESS SANDWICHES AND THE CRUSTLESS SANDWICH MADE THEREBY

This application is a divisional of U.S. application Ser. No. 10/331,031 filed Dec. 27, 2002, which in turn is a continuation of U.S. application Ser. No. 09/797,553 filed Mar. 2, 2001 now abandoned. The present invention relates to the art of mass producing crustless sandwiches using thin slices of standard baked bread having a crusted outer periphery.

INCORPORATION BY REFERENCE

In recent years a tremendous volume of crustless sandwiches have been mass produced for retail distribution using a technique disclosed in Kretchman U.S. Pat. No. 6,004,596. The concept involves an encapsulated center deposited food layer surrounded by bread pieces cut from standard baked white bread. After the pieces have been cut with matching shapes from separate bread slices, they are crimped together at their outer edges so the crimped area is spaced from the center composite food layer. This produces a bread-to-bread sealed joint around the composite food layer. The technology disclosed in Kretchman has resulted in a commercially successful peanut butter and jelly sandwich ideally directed toward consumption as snacks by children and busy adults. Since the present invention relates to an improvement over the technology shown in Kretchman U.S. Pat. No. 6,004,596, the technology of this patent is known to the trade and need not be repeated. This patent is incorporated by reference herein as background information.

A different crustless sandwich technology is shown in Sollerud U.S. Pat. No. 3,782,270 wherein the bread slices are separated by a squeezing action and not a combined cut and then crimped process. This squeezing action distorts the periphery of the crustless sandwich but does not guarantee integrity between the bread slices. Only a small squeezed seam holds the bread together. However, this patent does disclose a nozzle for extruding two food spreads simultaneously for forming a composite food layer, which may intersect the peripheral portion of the bread pieces. For the purposes of disclosing a dispensing procedure and the mechanism for dispensing food spread between two bread slices, Sollerud is incorporated by reference herein as background information.

BACKGROUND OF INVENTION

For many years, hors d'oeuvres and other types of crustless sandwiches have been made by cutting pieces of baked bread into a desired shape and placing a food substance between the two cut pieces. Sometimes the cook manually crimped the pieces together. Early on, this home technique involved a combined cutter device and crimper or merely a squeezing blade, as shown in Sollerud. These devices were used in home kitchens and did not allow optimum formation of a seal between the two bread layers. The seal between bread pieces is caused by the starch content of the breads. Such hand operated processes for producing crustless sandwiches with seal peripheries were not adapted for mass production to produce retail volumes of crustless sandwiches that must maintain a seal and good appearance over long times. The peripheral seal obtained by prior procedures used in the home, restaurants and other catering establishments did not guarantee a complete seal around the periphery of the sandwich. The edge would "fish mouth". The seal was unimportant. The sandwich was consumed at once. Any imperfections were of no significance. If the bread did not hold together, the person making the hors d'oeuvre or sandwich would merely manually squeeze the unsealed portion. It was found that the prior procedures resulted in the bread memory and improper seals causing an opening of the edges of the sandwich after long storage. In addition, internal spreads or coatings migrated to the edges to prevent the bread-to-bread contact for good sealing integrity. Apparently realization of the inconsistencies and the lack of an adequate peripheral seal obtainable by manual devices for creating crustless sandwiches, the automated process shown in Sollerud abandoned the concept of crimping flat peripheral areas as the bread was cut. This automatic machine merely pinched off or squeezed bread slices until the crust was separated and hopefully the small sealing area would hold. But, this type of process formed a very narrow sealing area that lacked integrity and had a pressure gradient inward of the edge. Such process was not usable technology for mass producing crustless sandwiches for retail distribution.

To overcome all of these disadvantages of domestic, manual and automated techniques for producing crustless sandwiches, the concept shown in Kretchman U.S. Pat. No. 6,004,596 was developed. In this technique, the two crusted slices of bread are provided with an inner deposit of spread leaving an outer marginal area free of foreign substance. The stacked bread slices with a center filling is then cut to produce matching pieces of bread surrounding the filling. Thereafter, a flat marginal area is crimped together, preferably using a plurality of spaced pressure points against a flat anvil surface. In this manner, the crimping action is optimized by being performed after the bread is cut to shape and having a constant pressure gradient inwardly and not affected by the cutting action. In processes where the crimping and cutting action is done simultaneously, the quality of the crimp is adversely affected by the cutting action. The technique shown in Kretchman is now used for mass producing crustless sandwiches hermetically packaged for retail distribution. The most popular of crustless sandwiches using the Kretchman technique is a peanut butter and jelly version wherein a layer of peanut butter is placed on opposite sides of a layer of jelly. Of course, the tern "jelly" means any type of fruit spread, such as, without limitation, jams, jelly and preserves. Since the viscosity of the inner layer of jelly is substantially less than the viscosity of the peanut butter, there is a tendency of the jelly to spread through the surface joint of the peanut butter layers. This leaching or spreading action can change the mouth feel of the bread pieces, especially after long shelf storage. In addition, when combining peanut butter and jelly, the amount of jelly is limited. The amount of jelly is determined by the size of the sandwich and the areas of the peanut butter encapsulating layers. It is desirable to produce a sandwich with a greater amount of jelly; however, such increased jelly increases the tendency of seepage of the jelly into contact with the bread slices. These mechanical phenomena cause limitations in the manufacturing process. Proportions of jelly and peanut butter were not optimized. Efforts to extrude a tube of peanut butter around a center of jelly merely increases the probability of seepage at the two ends of the tube. In addition, such tube is limited to the shape of the composite food layer between the bread slices. All of these disadvantages are dictated by the technique heretofore used to combine peanut butter and jelly into a composite ,food layer or mass in the center of a crustless bread sandwich, which bread sandwich presents technical difficulties not experienced in the domestic use of peanut butter and jelly on two slices of bread. Such domestic sandwiches merely involved a layer of peanut butter covered by a layer of jelly. The ratio of jelly to peanut butter was according to the consumer's taste. Jelly in the bread caused no problems because of immediate consumption.

THE INVENTION

The present invention relates to a method and apparatus for forming the center filling of a sandwich, such as a peanut butter and jelly sandwich made under the strict constraints of the technology necessary for making successful crustless sandwiches that have a high quality peripheral seal. The proportion of jelly to peanut butter is not limited by the process. The tendency of jelly to leach from the center filling is eliminated. Consequently, the invention is to a method and apparatus that allows mass production of a crustless sandwich having a composite center filling, wherein the center filling does not drastically decrease or affect the appearance of the product during long term storage required in retail distribution.

In accordance with the invention, there is provided a method for making a crustless sandwich from two thin slices of freshly baked bread having outer crust. "Thin" means less than ¾-inch. This method involves placing a first slice of the bread on a platen having a center portion and a pressure surface surrounding the central portion. This surface encompasses a closed given shape, such as a circle or a rectangle. In practice, the pressure surface is also the cutting surface for a knife or cutter defining the given shape. With the first slice of bread on the platen, a mass of a first food spread is formed onto the first slice above the center portion of the platen and spaced inwardly from the pressure surface of the lower support platen. The mass is formed with an inner lower layer having an outer rim extending upwardly from the lower layer. Consequently, the rim defines a closed receptacle or recess in the mass of the first food spread. This first food spread is, in the preferred embodiment, a high viscous peanut butter having a low water activity, such as below 0.60. With this low water activity, the peanut butter or first food spread in contact with the bread will not cause sogginess of the bread. The method involves placing a second food spread into the exposed receptacle or recess in the peanut butter. In practice, this second food spread is preferably known as "jelly." Since the jelly has a lower viscosity than the peanut butter, it tends to flow outwardly and fill the recess; however, the mass includes an outer rim preventing the jelly from spreading outwardly over the edge of the peanut butter layer. In this manner, the receptacle or recess can be as deep and as transversely large as necessary to accommodate the desired amount of jelly without fear of contacting the bread of the first slice with the jelly. In accordance with the invention, this receptacle recess with the jelly or second food spread is closed by a layer of the first food spread or peanut butter. Thus, a covering layer of peanut butter is placed over the recess and in contact with the upstanding rim dividing the recess. A second layer of bread is then placed over the capped recess forcing the upper layer of peanut butter into sealing relationship with the upstanding rim. This positively encapsulates the deposited jelly to produce a sealed composite food layer, which in the preferred embodiment comprises peanut butter and jelly as the first and second food spreads, respectively. By encapsulating the jelly in the peanut butter, only the low water activity peanut butter contacts the bread, thus preventing the bread from becoming soggy. The jelly normally has a high water activity such as greater than 0.60. Thus, contact of the jelly with the bread would have serious implications for long storage of the product as necessary for hermetically sealed sandwiches stored in freezers and/or on shelves. The invention involves a positive encapsulation of the second food spread in a precise receptacle formed by the first food spread. In the past, jelly was spread between larger layers of peanut butter. Consequently, the amount of jelly was limited. This does not necessarily give the optimum proportion. But, more jelly caused spreading into the bread. The invention eliminates this product limitation.

After forming the encapsulated composite food layer spaced inwardly from the marginal areas of bread above the pressure surface of the lower support platen, a second slice of bread is placed over the first slice to cover the composite food layer. Then, the bread slices are cut in unison in a cut pattern to remove the crust from both slices. In practice, the cut of the bread is by a knife or cutter acting against the flat surface encompassing the pressure surface. The cut pattern is the closed given shape of the sandwich. Thereafter, pressure is exerted around the periphery of the cut bread pieces and against the pressure surface of the platen to crimp the slices into a crustless sandwich at large marginal areas. The area has a thickness greater than 0.10 inches and preferably greater than 0.20 inches. This surface has a generally constant pressure gradient and not the decreasing pressure gradient of a pinch action as suggested in Sollerud U.S. Pat. No. 3,782,270. By first cutting the bread and then crimping the bread at a large flat marginal area surrounding the center filling, the crimping action is not dependent upon the cutting action and is uniform through the width of the marginal area. In addition, there is not squeezing or pinching action which causes a very thin interface between the two slices. Thus, the method of the invention involves the technique disclosed in Kretchman U.S. Pat. No. 6,004,596, with the improvement of the manner of controlling the composite food layer to allow accurate proportions of peanut butter and jelly and prevent undesired seepage from the composite food layer into the bread pieces. Such seepage as experienced in the past could adversely affect certain portions of the crimped periphery.

In accordance with another aspect of the present invention, the central portion of the platen supporting the first spread slice is recess. This recess is preferably a concave structure especially when the sandwich is circular. This recess portion may be quite shallow but allows the bread pieces to be crimped without undue pressure on the bread in the central portion of the sandwich being produced. The upper peripheral surface around the recess is normally flat to define the cutting surface and the crimping surface.

Yet another aspect of the invention is the use of a pressure plate for the crimping action at the periphery of the previously cut bread pieces, wherein the lower pressure surface overlies the pressure surface of the sandwich supporting platen. In the preferred embodiment, the lower pressure surface includes spaced projections to create depressions in at least the top slice of bread to form spaced pressure points in the crimped slices. Preferably, the projections are undulations in the pressure surface or a series of spaced rectangular projections. The pressure surface on the platen is flat and defines the cutting surface also. In an embodiment, the platen defines an outer edge to coact with a cutter in a scissor cutting action.

In accordance with another aspect of the invention, the upwardly facing pressure surface of the platen has projections, which may or may not match the projections on the pressure plate. Various arrangements and modifications of the pressure plate and the pressure surface of the platen can be made to enhance the precise crimping action between the outer flat surfaces of the previously cut bread pieces. The cut can be like a cookie cutter against a flat surface or by a scissor cutting action with an edge on the platen. Thus, crimping is a separate and distinct process which can be optimized by modifying the crimping surfaces which are relatively broad and encompass a substantial marginal area of the sandwich being produced. The width of the crimped marginal areas of the bread pieces are at least 0.10 inches. In practice, the crimped area is at least 0.20 inches in width. This gives a general constant force gradient over the flat marginal area. This is different from a squeezed or pinched separation seam.

In accordance with yet another aspect of the present invention, there is provided an apparatus for making a crustless sandwich from two slices of bread with outer crusts. This apparatus comprises a device to place a first slice of bread on a platen with a center portion and a pressure surface surrounding the central portion encompassing a closed given shape. In the preferred embodiment, the pressure surface is a flat surface against which the cut is made to define the shape of the sandwich. A dispenser deposits a mass of a first food spread onto the first slice of bread above the central portion of the platen and spaced inwardly from the pressure surface of the platen. This mass is formed from an inner lower layer and has an outer rim with a height of at least 0.10 inches and preferably greater than ⅛-inch. The formed rim extends upwardly from the lower layer to define a closed receptacle recess in the mass. This is the "jelly" pocket formed in the peanut butter. A device is then used to place a second food spread into the receptacle recess before a second dispenser applies a layer of the first food spread generally coextensive with the mass and supported on the outer rim of the mass. This allows the first spread to encapsulate the second food spread, forming a center composite food layer. This constitutes a novel feature of the invention. To complete the sandwich, a second bread slice is placed over the first slice. Then, the two slices are cut into the desired shape. The cut can be with a cookie cutter or a scissor cutter. Thereafter, the outer periphery of the previously cut slices is crimped at the peripheral flat marginal areas. The crimping action is by a force gradient generally constant over the marginal areas. This allows optimization of the crimping action as taught by Kretchman U.S. Pat. No. 6,004,596.

Another aspect of the present invention is the provision of a crustless sandwich made from two slices of bread baked to include outer crust. The sandwich comprises first and second matching crustless bread pieces cut from the crusted bread slices. The bread pieces have the same general outer shape defined by an outer periphery with central portions surrounding the flat outer marginal areas to provide facing bread surfaces at the central portions of the slices. A composite food layer is provided between the central portions of the slices and is spaced inwardly from the flat marginal areas of the slices. The composite food layer includes a mass of a first food spread having a lower layer with an upstanding rim to define a closed receptacle recess or pocket. In accordance with the invention, this recess is filled with a second food spread, such as jelly, and is covered by a layer of the first food spread to encapsulate the second food spread. In this manner, the desired ratio of jelly to peanut butter can be used in the sandwich. The quantity of jelly is not limited by the quantity of peanut butter. The jelly is held in the peanut butter that is sealed from leaching of jelly as the crimping action takes place. This crustless sandwich has the advantages discussed with respect to the method of making the sandwich.

The primary object of the present invention is the provision of a method and apparatus for making a crustless sandwich, which method and apparatus combines the advantageous processing procedure in Kretchman U.S. Pat. No. 6,004,596 with the ability to control the portions of two food spreads between the bread pieces, where the spreads are a composite layer in the sandwich. There is the ability to prevent spreading of the center food spread from two encapsulating layers of bread contacting food spread. One food spread prevents leaching of the inner food spread under the pressure of the crimping action or by mere migration.

Yet another object of the present invention is the provision of a method and apparatus, as defined above, which method and apparatus allows the positive encapsulation of jelly in peanut butter so that jelly does not engage the bread.

Yet another object of the present invention is the provision of a method and apparatus, as defined above, which method and apparatus allows the optimization of the proportion of peanut butter and jelly in a crustless sandwich, without the disadvantage of unwanted leaching or the need to reduce the size of the flat marginal crimping surfaces.

Still further object of the present invention is the provision of a crustless sandwich made by the method and apparatus of the present invention, which sandwich can be hermetically packaged and used for retail distribution with quantity control of the filling and prevention of unwanted contact between one food spread, such as jelly, and the bread.

These and other objects and advantages will become apparent from the discussion of the distinction between the invention and the prior art and when considering the preferred embodiment as shown in the accompanying drawings.

PREFERRED EMBODIMENT

Figure 1:
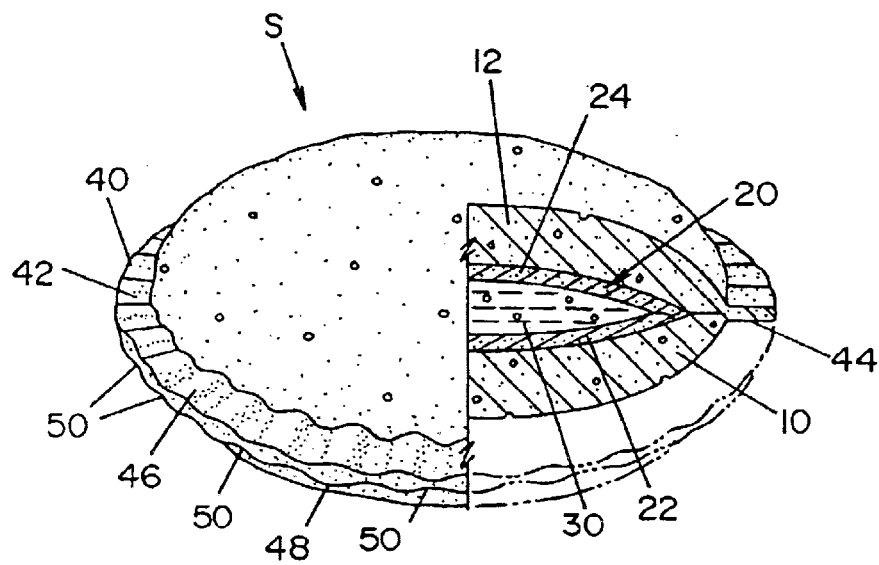
FIG. 1 is a pictorial view partially cross-sectioned of a crustless sandwich made with one embodiment of the invention.
Figure 18:
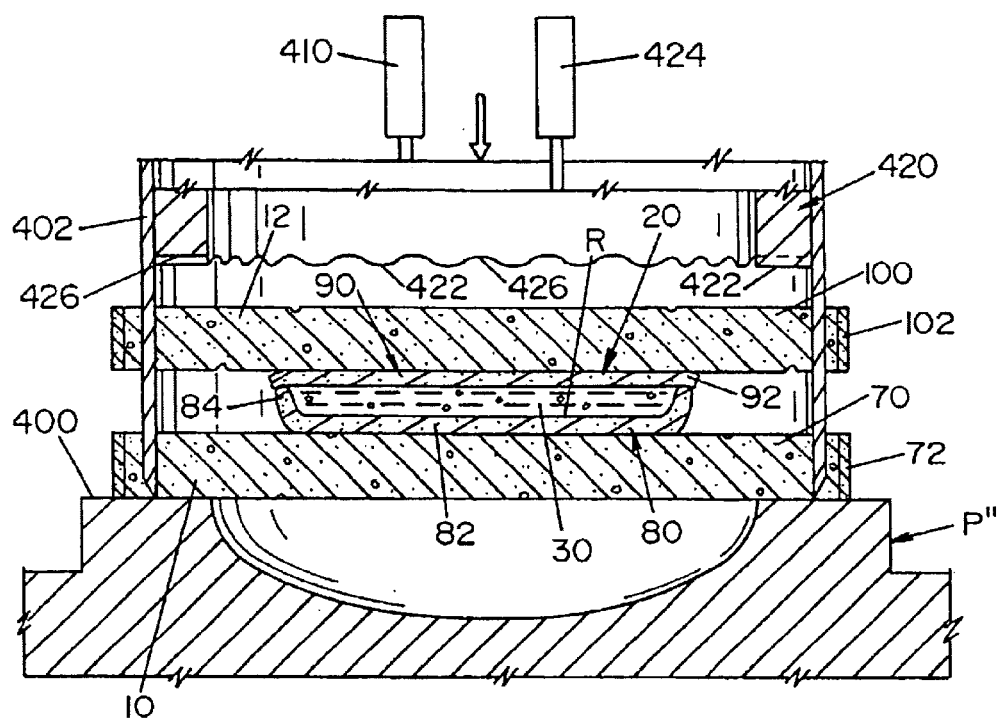
FIG. 18 is a cross-sectional view of the cutting method and apparatus now preferred for completing a sandwich using the invention; and, FIG. 19 is a cross-sectional view of the apparatus shown in FIG. 18 with the preferred crimping method and apparatus for completing a sandwich formed by practicing the present invention.

Referring now to the drawings wherein the showings are for the purpose of illustrating the preferred embodiment only and not for the purpose of limiting same, FIG. 1 shows a crustless sandwich S manufactured by the method and apparatus of the invention and constituting an aspect of the invention. This sandwich has a first piece 10 of bread cut from a crusted slice and a second piece 12 of bread cut from a second crusted slice. These bread slices are freshly baked and are white bread made from batter known in the art for providing a sealing action when pressed together at an elevational pressure. As illustrated, the sandwich is circular; however, in accordance with the invention it can be rectangular, triangular, oblong or other shapes without departing from the concept of the invention. Sandwich S includes a central composite food layer 20 interior of the flat crimped marginal areas and formed from a first deposit 22 of the first food spread which, in practice, is peanut butter. A second deposit 24 of this same first food spread encapsulates a central filling of a second food spread, which in practice is known to the consumer as "jelly"; however, the food spreads of deposits 22, 24 and the filling 30 can be modified. The water-activity of the first food spread is low being less than about 0.60, whereas the second food spread of the filling can have a variety of low or high water activities. In practice, the jelly has a water activity of greater than 0.60. These water activities are representative in nature and are selected so that the first food spread will not cause pieces 10, 12 to become soggy during long term shelf storage. Since the first food spread encapsulates filling 30, the filling can have higher water activity without contacting the bread to cause deleterious imperfections which are not tolerable in mass produced sandwiches for retail distribution. Periphery 40 is the cut profile or shape for each bread piece 10, 12 and is outside the flat marginal areas 42, 44. These areas have a flat width of at least 0.10 inches and preferably 0.20 inches. The marginal areas do not contain food spread or other substance and constitute the crimping areas of bread-to-bread contact over a large sealing area. In the embodiment of the invention shown in FIG. 1, the crimping is accomplished by undulating surfaces to provide undulations 46, 48 producing pressure points 50 that the high points of the undulations match each other and cause high pressure exertion at aligned locations around periphery 40 of sandwich S. In practice, there are no undulations on the under surface which is formed by a generally flat anvil surface. This surface is laterally extended to give a cookie cutter surface as shown in FIG. 18.

The acts performed to produce crustless sandwich S are disclosed in FIGS. 3–8. Many variations of these process operations or acts can be used to accomplish the objective of producing a crustless sandwich which has a flat area sealed periphery using the disclosed technology. Features from the several apparatuses can be combined to perform the production process of the claimed invention. Thus, the cutting techniques and the crimping techniques can be combined to produce a magnitude of apparatuses.

Figure 2:
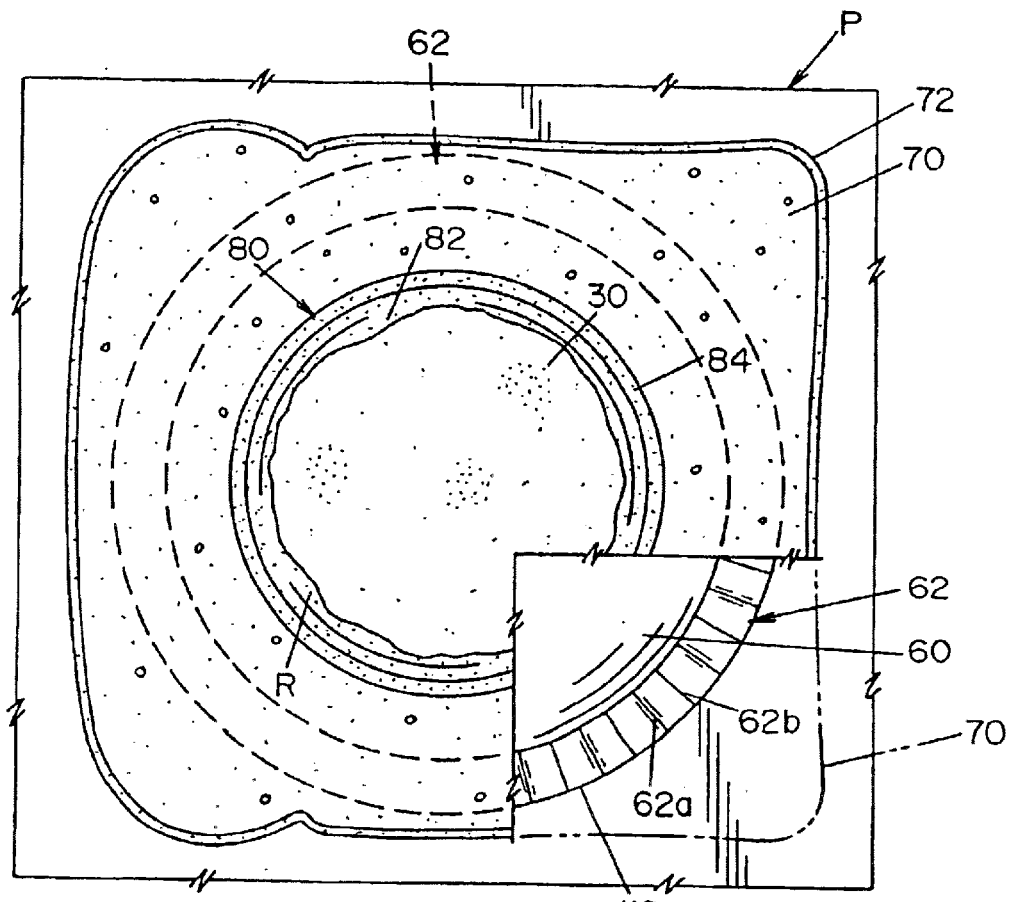
FIG. 2 is a top plan view taken through the crustless sandwich at the stage of manufacturing shown in FIG. 4 with a cut-away view showing a portion of the lower support platen.
Figure 3:
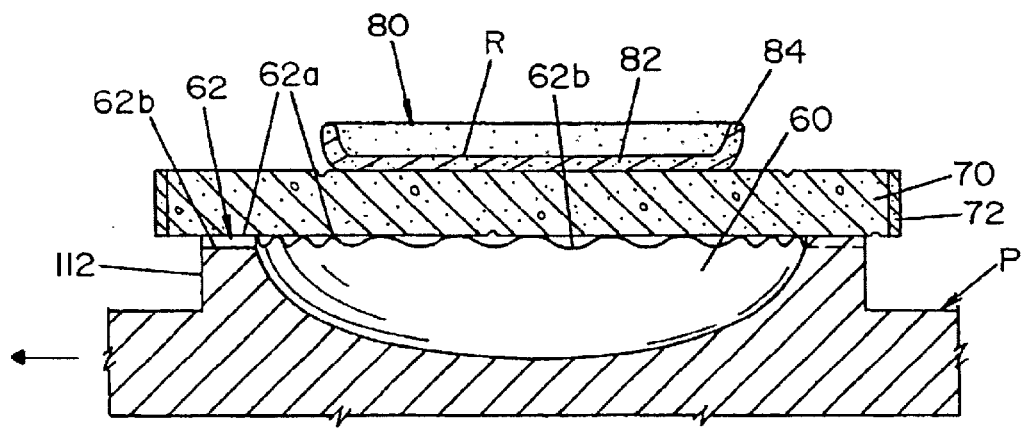
FIGS. 3–8 are a series of cross-sectional views at progressive operations in the manufacturing of the crustless sandwich using an alternative cutting action and crimping action.
Figure 4:
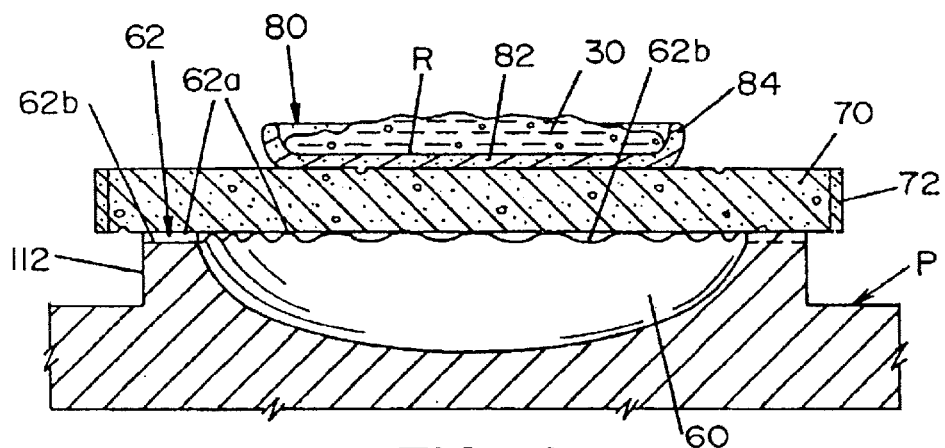
Figure 5:
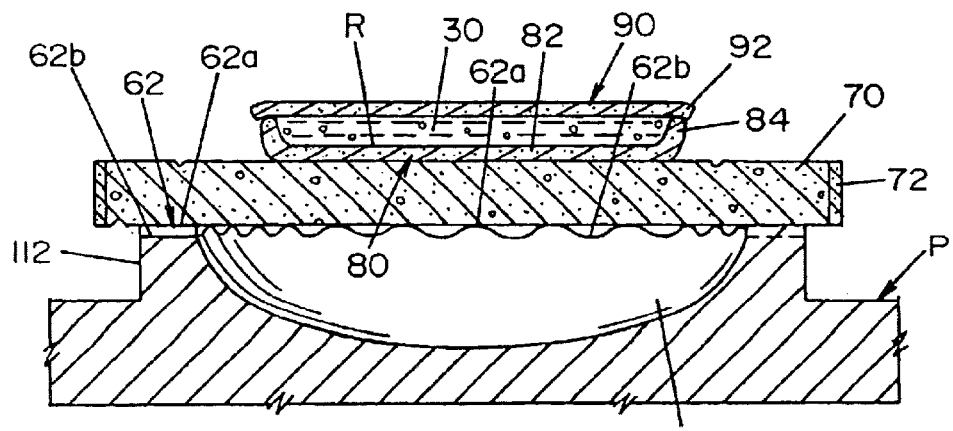
Figure 3A:
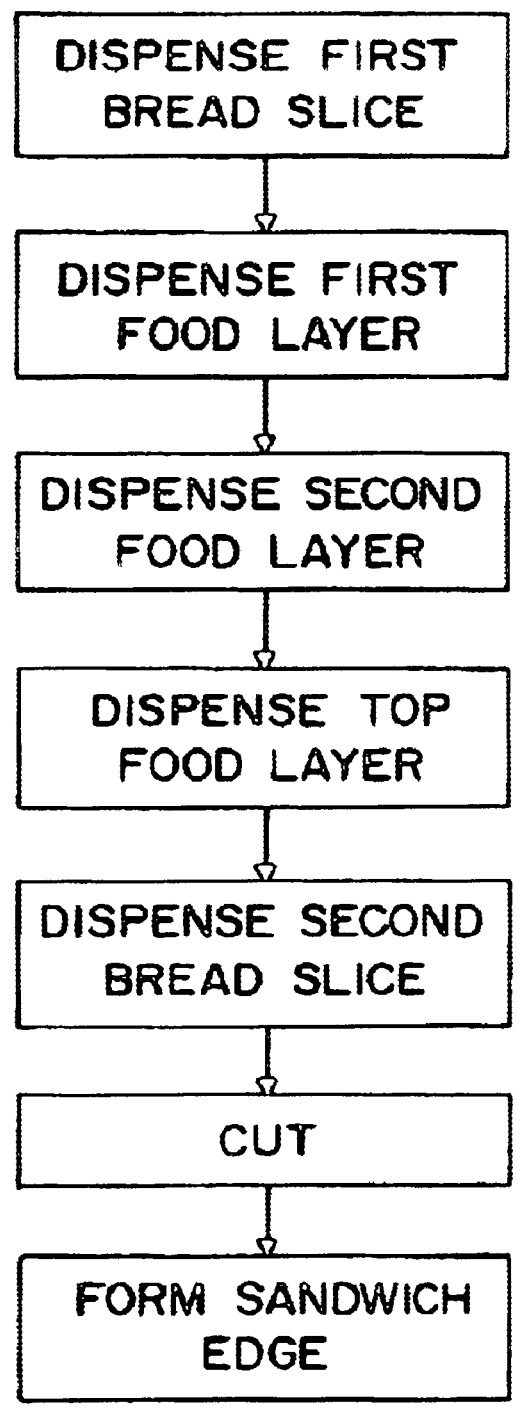
Figure 19:
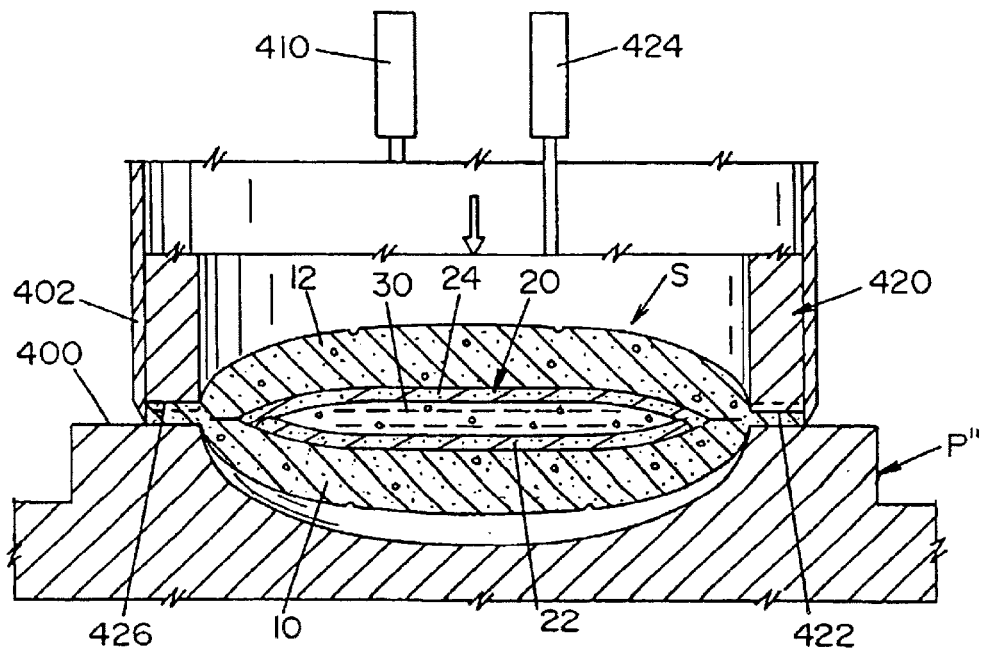

In accordance with the invention, the quantity and proportion of filling 20 is controlled without experiencing a squeezing of the filling into the bread or the crimped marginal areas during assembly of the sandwich. In the illustrated embodiment, a movable platen P is used to receive the assembled components of the crustless sandwich. Platen P is movable to allow each of the process acts to be performed at different locations in an assembly line without requiring movement of the partially assembled sandwich components. In one aspect of the invention, the central portion 60 of platen P is recessed. Since the illustrated embodiment is a circular sandwich, a somewhat common recess has a concave configuration of central portion 60 as shown in the figures. This platen also includes upwardly facing pressure surface 62 which is preferably flat as shown in FIGS. 10–13, but is illustrated for completeness as including an alternative surface. As shown in FIGS. 18 and 19, the preferred flat crimping support surface extends laterally to define the cutting surface of a cookie cutter. All of these concepts are used in appropriate combination to practice the invention. In the alternative concept, undulations are on the pressure surface. The undulations define high points 62a and low points 62b to give spaced projections formed by the high points 62a. As shown in FIG. 3, a first slice of bread 70 having a thickness of less than ¾-inch and an outer crust 72 is placed over platen P and aligned with central portion 60 so that pressure surface 62 is within the crust, as best shown in FIG. 2. The bread slices are preferably in the range of ½–¾ inch in thickness to control the bread component of the sandwich. A formed mass 80 of a first food spread, preferably peanut butter, produces the first deposit 22 of composite food layer 20. This formed mass includes a thin inner lower layer 82 with a thickness to assure no lower holes and a peripherally extending rim 84 to define a central filling receiving receptacle, pocket, or cavity R. The rim has a height of at least 0.10 inch and preferably at least ⅛-inch. The volume of receptacle R is controlled by the exposed area of thin lower layer 82 and the extended height of peripheral rim 84. Consequently, the volume of the receptacle is controlled to receive the desired amount of filling 30 as shown in FIG. 4. In this manner, larger proportions of jelly to peanut butter can be provided in sandwich S without risking jelly to bread contact and its long term deleterious effect. FIG. 2 is a cross section of the assembled sandwich as it has progressed to the operation illustrated in FIG. 4. Thereafter, the inventive aspect of the present invention is completed by the operation as illustrated in FIG. 5 wherein upper layer or cap 90 is deposited to cover filling 30 and close receptacle R by overlying rim 84. This produces a second deposition 24 of composite food layer 20. Layer 90 has outer edge 92 to cover receptacle R. The edge has a shape determined by the shape of receptacle R which, in the preferred embodiment is circular, to encapsulate filling 30 in receptacle R. Thereafter, sandwich S is processed in accordance with the technology described in Kretchman U.S. Pat. No. 6,004,596. This apparatus and process is best shown in FIGS. 18 and 19. Certain modifications of the apparatus and method in the Kretchman patent are shown in FIGS. 1–8. However, these modifications are not essential to the operation of the invention. The invention involves forming central composite food layer 20 in a crustless sandwich. The several devices and apparatuses featured are for technical completeness.

Figure 6:
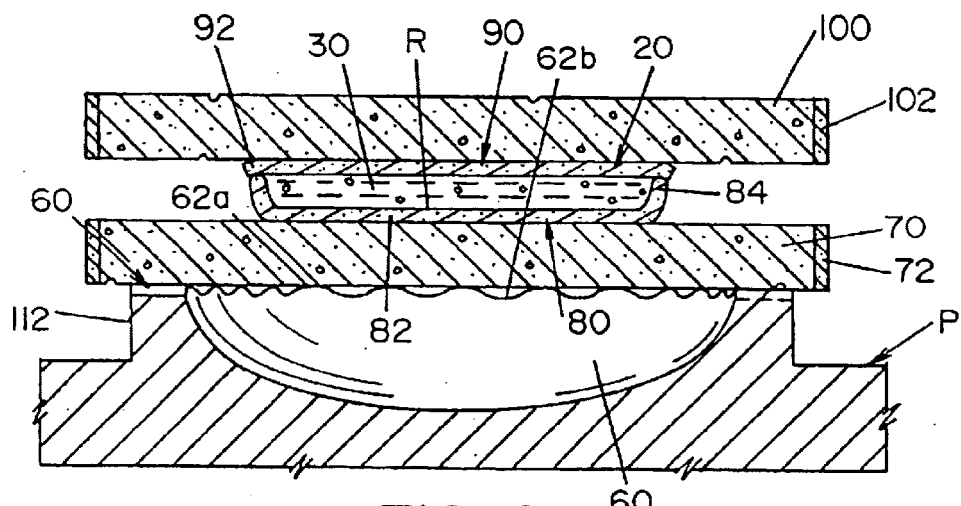
Figure 7:
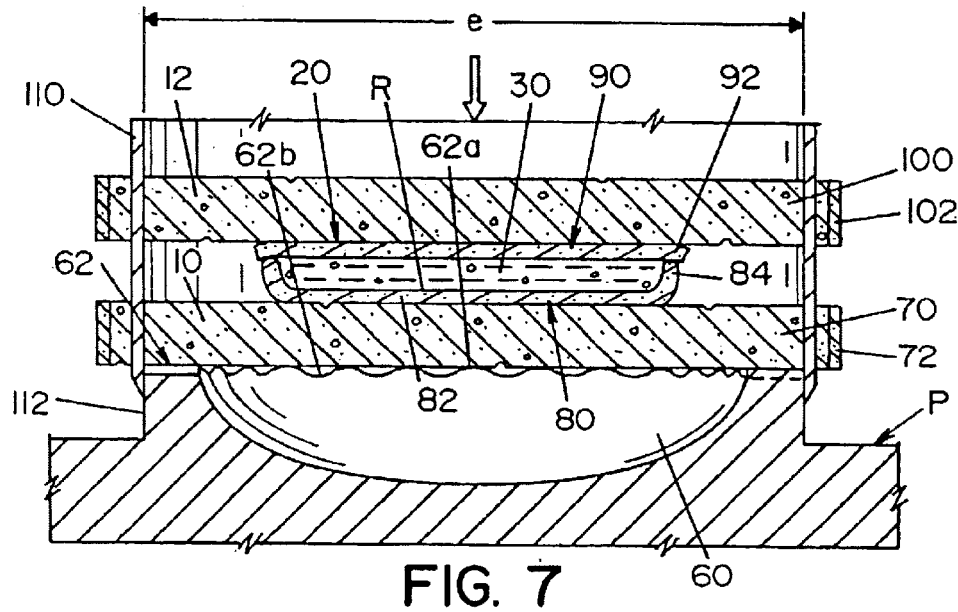
Figure 8:
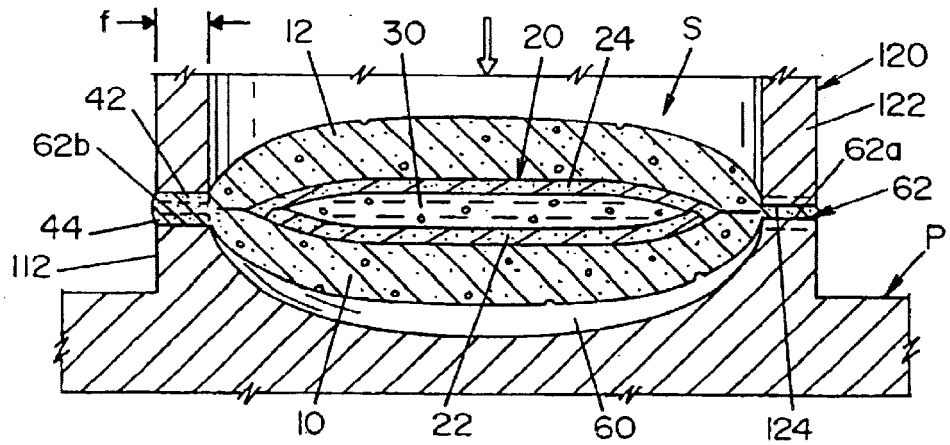
Figure 11:
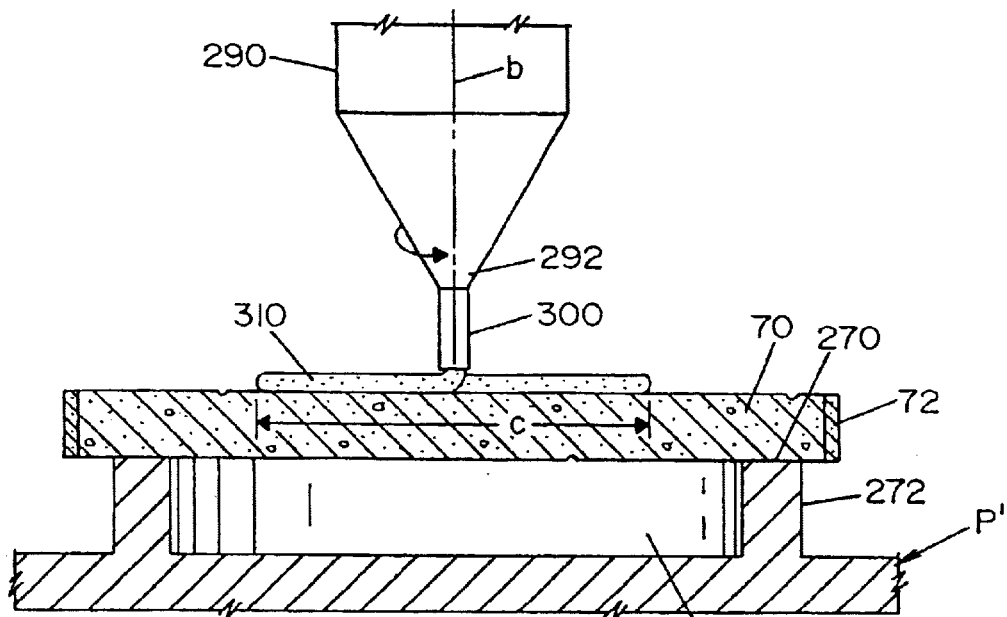
FIGS. 11–13 are schematic cross-sectional views illustrating progressive stages in forming the jelly pocket using a process and apparatus constituting an alternative embodiment of the invention.
Figure 12:
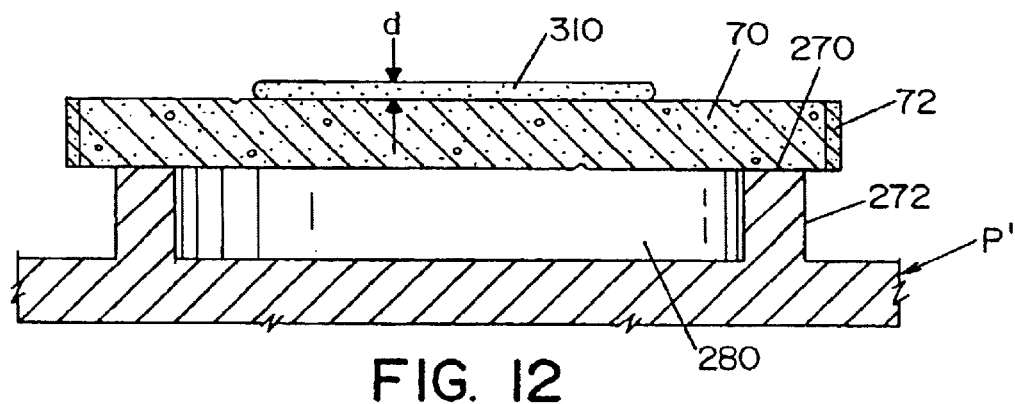
Figure 13:
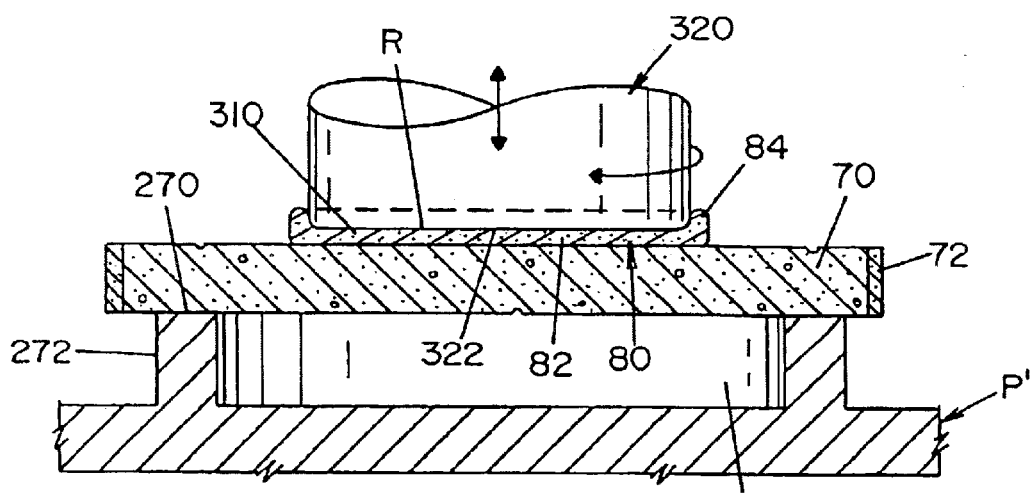
Figure 14:
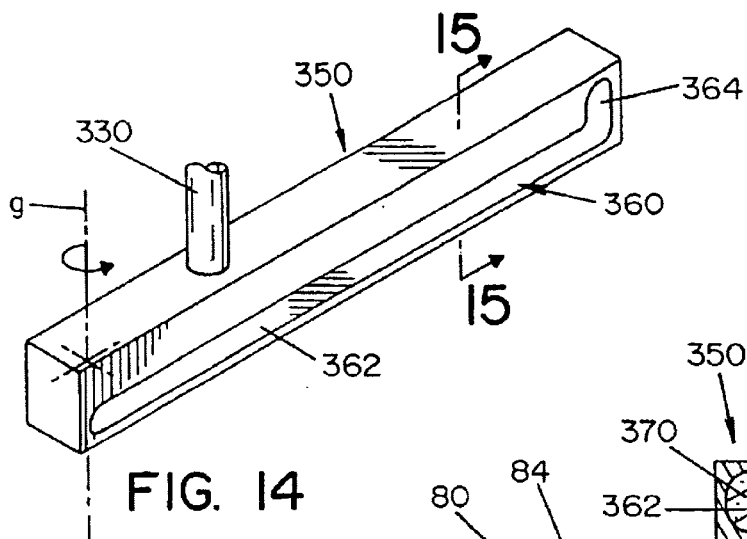
FIG. 14 is an enlarged partial pictorial view showing a further outlet nozzle to dispense peanut butter when practicing the invention.

The invention is the concept of providing the centrally located composite food layer 20 inboard of the flat crimping marginal areas of pieces 10, 12 by using a formed layer of a consistent first food spread to provide a formed lower structure capable of maintaining a receptacle R for receiving and containing filling 30 for subsequent encapsulation by upper layer 90. The second thin slice 100 of a bread having an outer crust 102 is placed in general align rent with slice 70 over composite food layer 20, which in turn is aligned with recess 60 and spaced inwardly from pressure surface 62. This process is shown in FIG. 6, but could be done by several apparatuses and methods. Pressure surface 62 is generally aligned with marginal areas 42, 44 of the slices of crusted bread. In FIG. 7, slices 70, 100 are cut in unison to produce the matching pieces 10, 12 with a diameter e. Cutting is preferable as shown in FIG. 18. The unison cutting assures that the pieces match in shape and remain aligned on platen P. The shape of periphery 40 is determined by knife or cutter 110 coacting in a scissor action with cutting surface 122 of platen P for providing the crustless sandwich with outer marginal areas not yet joined. This scissor action is an alternative to the preferred cookie cutter type cutting shown in FIG. 18. The marginal areas 42, 44 have a width determined by surface 62. In practice, this width is at least 0.10 inch and in the general range of 0.20–0.50 inches. In FIG. 8, a crimper 120 which is a cylinder in the preferred embodiment is normally slidably received in cutter 110; however, it can be separate from the cutter. By reciprocating crimper 120 in cutter 110, the shape of periphery is closely matched with the crimping action of crimper 120. The crimper includes cylindrical wall 122 having a lower surface 124 which could be flat as shown in FIGS. 11–13. This flat wall has protrusions to create pressure points. It acts against a lower flat wall, preferably without protrusions and with a lateral position as shown in FIGS. 18–19. An upper flat surface without undulations is preferred when low support surface 62 has undulations. If surface 62 is flat, which is normal, then preferably the lower surface 124 has spaced projections illustrated as alternating undulations with high points and low points. If both the pressure surface 62 and lower crimping surface 124 are undulating, it is preferred that the high points of the undulations match to produce the configuration shown schematically in FIG. 1. In practice, spaced high pressure points are used to assure a positive crimping interaction between the slices 10, 12. Various projections and combinations of projections can be used for this purpose. In practice, the projections shown in Kretchman U.S. Pat. No. 6,004,596 are employed with the projections being spaced inwardly from periphery 40 to create high pressure points spaced inward from the outer periphery 40 a small distance. In practice, this inward spacing distance is approximately 1/16–1/8 inches. The pressure points could extend to periphery 40; however, they are preferably spaced inwardly. Crimper 120 as shown in FIG. 8 matches the pressure surface 62 to crimp marginal areas 42, 44 at locations outward from the central composite food layer 20.

Figure 9:
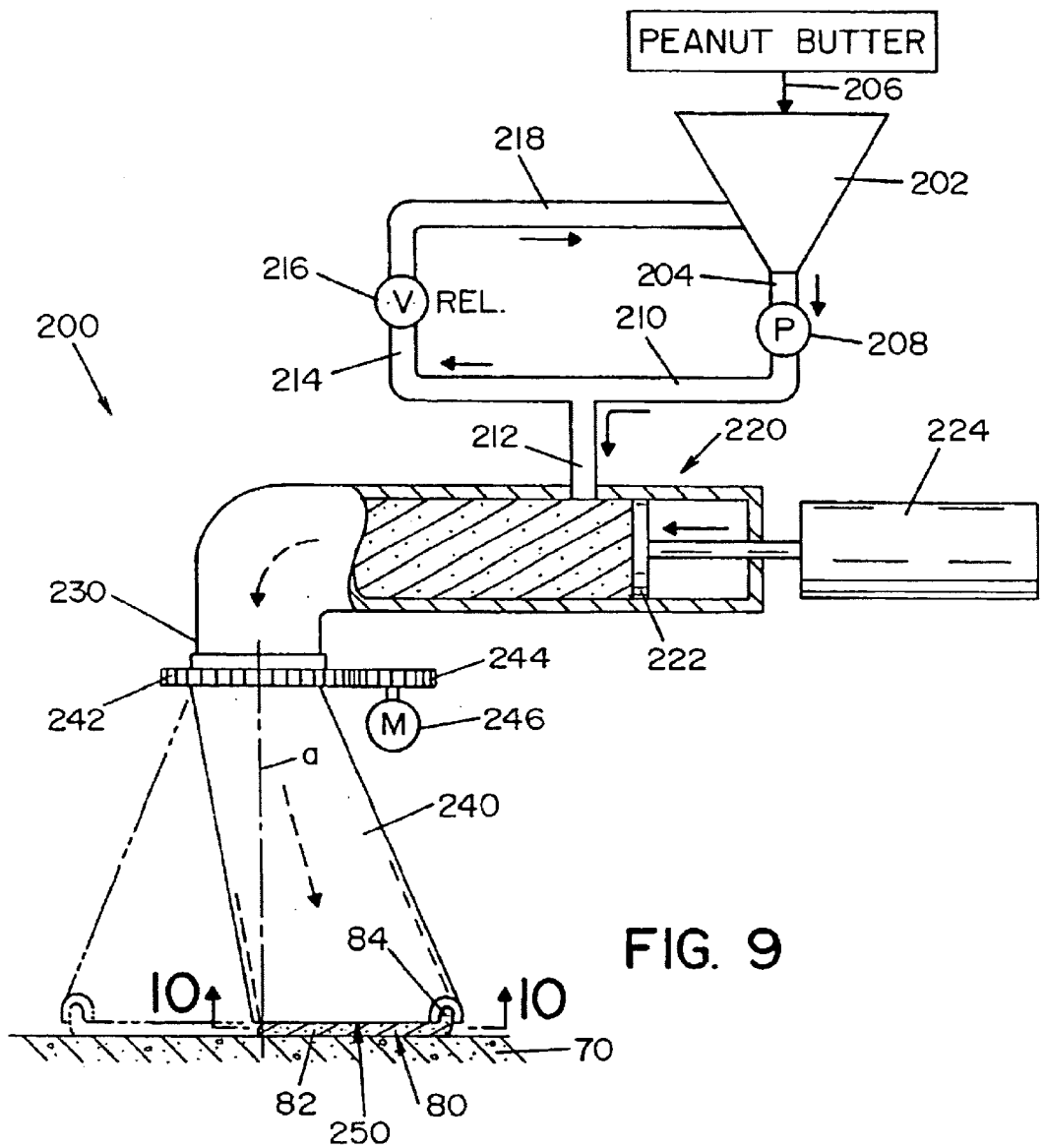
FIG. 9 is a schematic side elevational view illustrating a dispenser for practicing the preferred embodiment of the present invention.
Figure 10:
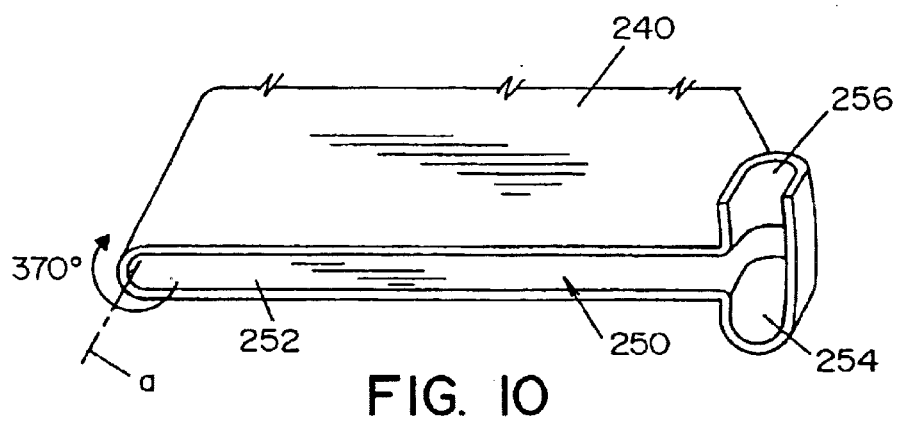
FIG. 10 is an enlarged, partial pictorial view taken generally along line 10—10 of FIG. 9 and showing the outlet nozzle of the dispenser schematically illustrated in FIG. 9.

A variety of dispensers could be used for depositing formed mass 80 onto slice 70 to provide an upwardly facing receptacle R. One embodiment is illustrated in FIGS. 9 and 10 showing dispenser system 200 having a hopper 202 for receiving peanut butter having a viscosity in the general range of 4000–10000 centipoise and preferably above 6000 centipoise. The peanut butter has a water activity less than about 0.60 to prevent water leaching into bread slice 70. Hopper 202 has an outlet feed pipe 204 and is supplied with peanut butter at inlet 206. Pump 208 forces peanut butter into pipe 210 with outlet 212. Return line 214 includes pressure relief valve 216 for returning peanut butter through pipe 218 back to hopper 202. Thus, fresh pressurized peanut butter is available at outlet 212. A dispensing feed ram unit 220 is communicated with feed outlet 212 to receive peanut butter in sufficient quantities to deposit the desired amount of peanut butter to form mass 80. Piston 222 is reciprocated by drive device 224 having a stroke for each reciprocation to deposit the desired amount of peanut butter in mass 80. The peanut butter is directed through chute 230 into a thin spout 240 rotated about axis a by a drive gear 242 rotated through pinion gear 244 driven by stepping motor 246. As each slice of bread is moved by platen P under dispenser system 200, step motor 246 rotates thin outwardly extending spout 240 through an angle of over 360°. In practice, the rotation is through an angle of 370°. Axis a is generally centered with respect to pressure surface 62 of platen P. During this rotation, piston 222 is cycled by a stroke forcing a desired amount of peanut butter through outlet opening 250 onto slice 70. Nozzle 250 at the outlet end of thin spout 240 has a relatively narrow leg 252 terminating in a radially outward large volume dispensing opening 254. The trailing edge of spout 240 includes a rim shaping mouth 256 intersecting opening 254. As a large volume of peanut butter is dispensed through opening 254, it is shaped by the contour of mouth 256 to produce rim 84 of mass 80. As drive device 224 squeezes peanut butter though nozzle 250 the nozzle is rotated about axis a by motor 246 through an angle of 370°. Nozzle 250 of spout 240 is spaced above bread 70 a distance to clear or set the thickness of layer 82. This is one dispensing system that can be used in practicing the invention to produce the desired form mass of peanut butter to receive the desired amount of jelly or filling 30 as so far described. Several arrangements can be used to provide pressurized peanut butter at the dispensing spout. The spout can also have many mechanical versions.

An alternative mechanism for forming mass 80 with a lower layer 82 and rim 84 is schematically illustrated in FIGS. 11–13. A movable platen P' includes an upwardly facing, lower flat pressure surface 270 circumscribed by cutting edge 272. In practice, surface 270 is extended laterally to give a cutting surface as shown in FIGS. 18 and 19. Slice 70 is deposited upon platen P' above recess 280 in a manner and for the reasons previously discussed. A pressurized peanut butter hopper 290 similar to the hopper in FIG. 9 includes a downwardly extending feed pipe 292 directing peanut butter to an elongated rotating spout 300. System 200 shown in FIG. 9 is a preferred system to pressurize the peanut butter. A dispenser piston and rotating mechanism as in FIG. 9 is used, but not shown. Spout 300 is rotated about axis b and includes two outboard legs with thin openings extending from axis b and each having a length of approximately ½ diameter c of circular deposit 310. Feed ram unit 220 forces peanut butter into the circular deposit 310 to a depth indicated as thickness d. Thereafter, as shown in FIG. 13, forming plug 320 is heated and rotated fairly rapidly. The plug includes a contoured end 322 movable into deposit 310 to force the peanut butter into the upstanding rim 84 while leaving a thin lower layer 82. This produces a jelly receptacle or pocket R for the purposes previously described. This gives one of several alternative procedures to produce the "jelly" pocket R.

Figure 15:
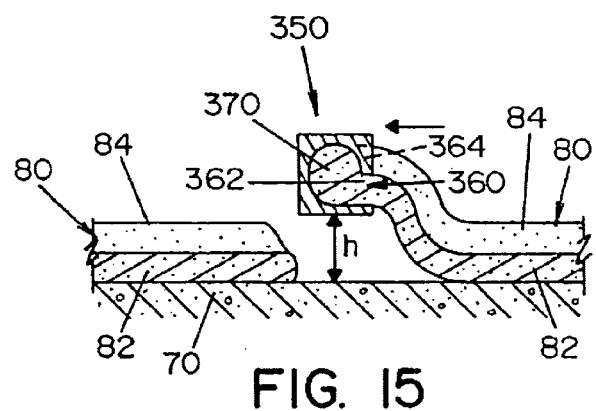
FIG. 15 is an enlarged cross-sectional view taken generally along line 15—15 together with an illustration of the use of this outlet nozzle.
Figure 16:
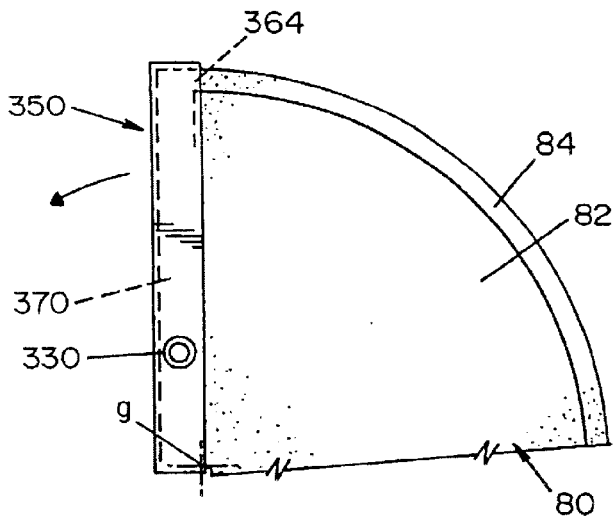
FIG. 16 is a top plan view showing progressive operation of the outlet nozzle illustrated in FIGS. 14 and 15.
Figure 17:
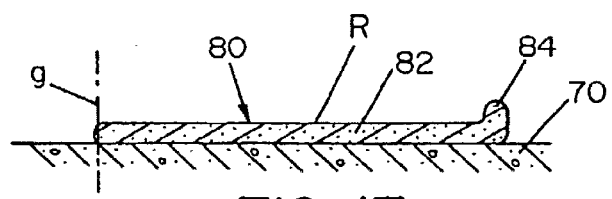
FIG. 17 is a cross-section of the mass of peanut butter applied by use of the outlet nozzle shown in FIG. 14.

Referring now to FIGS. 14–17 an alternative arrangement for forming the jelly receiving mass 80 is illustrated. An outwardly extending rotating spout 350 is similar to spout 240 in FIG. 9 and is rotated about axis g perpendicular through the bread slice 70. A horizontally discharging nozzle 360 is substituted for the downwardly directed nozzle 250 best shown in FIG. 10. Nozzle 360 includes a thin leg 362 extending outwardly from axis g and terminating in a large rim forming opening 364. Plenum chamber 370 in spout 350 is connected to chute 330 for directing peanut butter into passage 370 where it is forced outwardly by feed ram unit 220 as spout 350 is rotated through over 360°. Spout 250 is spaced upwardly from bread 70 a distance generally matching the thickness of layer 82. In a like manner, spout 350 is rotated above bread 70 a distance h to 64 allow progressive deposition of layer 82 and rim 84 with clearance of the rim, as best shown in FIG. 16. This produces a radius portion of mass 80 shown in FIG. 17. As the spout is rotated, the circular mass is completed. As shown in FIG. 15, the spacing h allows spout 350 ro rotate over the previously formed portion of mass 80 at the end of the mass forming cycle. A large variety of other forming mechanisms can be used to practice the present invention which is directed to the formation of the lower food layer having an upwardly opening receptacle with a controlled volume to allow the desired quantity of an encapsulated second food item. Thus, the desired taste characteristics are produced in a manner heretofore unobtainable in crustless sandwiches. If mass 80 is not circular, it is still formed with an upper opened recess for filling 30.

As so far disclosed, the sandwich making apparatus can have many designs. The lower pressure surface can be flat. It can extend laterally to provide a cutting surface. It can terminate in a scissor cutting edge. The flat surface encompasses the marginal crimping areas of the bread pieces. In practice, the apparatuses shown in FIGS. 18 and 19 are preferred to make the sandwich around central composite layer 20. Assembled bread slices and central layer 20 as shown in FIG. 7, irrespective of the process to obtain layer 20, is supported on platen P" with pressure surface 400 large enough to match or encompass the marginal crimping areas of the final sandwich S. The surface also extends outward to give a cutting surface for knife or cutter 402 moved vertically by pneumatic cylinder 410 to cut the bread slices 70, 100 into the desired shape. An internal crimper 420 in the form of a crimping die with projections 422 is moved vertically by pneumatic cylinder 424. Bottom edge 426 of crimping die 420 has a shape matching the cut shape of cutter 402 and is spaced inwardly to give a generally constant force gradient over the marginal areas of the slices cut to form sandwich S. The cutting action is first and separate from the crimping action.

The sandwich is formed with small forces, if any, to compress the bread in center. When the marginal layers are crimped together, they are joined by the sticking action experienced when forming dough balls from fresh white bread.

Having thus defined the invention, the following is claimed:

1. A mass-production apparatus for making a commercial sandwich from two slices of bread, said apparatus comprising a platen designed to receive a first slice of said bread, said platen having a sealing surface surrounding a central portion, a first slice dispenser to deposit a first slice of bread on said platen such that only a portion of said first slice of said bread lies over said central portion, a first food dispenser to deposit a mass of a base food spread onto said first slice of bread above said central portion of said platen and at least partially spaced inwardly of said sealing surface, a second food dispenser to deposit a mass of an intermediate food spread on said base food spread at least partially inwardly of a peripheral edge of said base food spread, a top food dispenser to deposit a mass of a top food spread over said intermediate food spread to substantially encapsulate said intermediate food spread between said top and base food spreads, and a second slice dispenser to deposit a second slice of bread on said top food spread.

2. The apparatus as defined in claim 1, wherein said top and base food spreads are substantially the same and said intermediate food spread is different from said top and base food spreads.

3. The apparatus as defined in claim 2, wherein said top and base food spreads include nut butter and said intermediate food spread includes jelly.

4. The apparatus as defined in claim 1, including a cutter to cut said first and second bread slices substantially in unison about a cutting surface of said platen that is adjacent said sealing surface of said platen.

5. The apparatus as defined in claim 2, including a cutter to cut said first and second bread slices substantially in unison about a cutting surface of said platen that is adjacent said sealing surface of said platen.

6. The apparatus as defined in claim 4, wherein said cutter at least partially removes crust from at least one of said bread slices.

7. The apparatus as defined in claim 5, wherein said cutter at least partially removes crust from at least one of said bread slices.

8. The apparatus as defined in claim 1, including a pressure plate to at least partially press together a region spaced inwardly of an outer peripheral edge of said first and second bread slices by forcing said first and second bread slices against said pressure surface of said platen, said region substantially absent said base, intermediate and top food spreads.

9. The apparatus as defined in claim 5, including a pressure plate to at least partially press together a region spaced inwardly of an outer peripheral edge of said first and second cut bread slices by forcing said first and second bread slices against said pressure surface of said platen, said region substantially absent said base, intermediate and top food spreads.

10. The apparatus as defined in claim 8, wherein said pressure plate includes spaced projections to form spaced pressure points in at least one of said bread slices as said first and second bread slices are forced together.

11. The apparatus as defined in claim 9, wherein said pressure plate includes spaced projections to form spaced pressure points in at least one of said bread slices as said first and second cut bread slices are forced together.

12. The apparatus as defined in claim 1, wherein said central portion of said platen is at least partially recessed and has a depth that receives at least a portion of said one slice of said bread during the making of said commercial sandwich.

13. The apparatus as defined in claim 11, wherein said central portion of said platen is at least partially recessed and has a depth that receives at least a portion of said one slice of said bread during the making of said commercial sandwich.

14. The apparatus as defined in claim 12, wherein said recessed portion has a substantially inverted dome shape.

15. The apparatus as defined in claim 1, wherein said sealing surface is substantially flat.

16. The apparatus as defined in claim 11, wherein said sealing surface is substantially flat.

17. A mass-production apparatus for making a commercial sandwich having two slices of bread and a base, intermediate, and top layer of food spread positioned between the slices of bread, said apparatus comprising a platen having a sealing surface surrounding a recessed central portion, a first slice dispenser to deposit a first slice of bread on said platen such that only a portion of said first slice of said bread lies over said recessed central portion, a first food dispenser arrangement that at least partially deposits a mass of the base layer of food spread onto the first slice of bread above said recessed central portion and at least partially spaced inwardly of said sealing surface of said platen, a second food dispenser arrangement that at least partially deposits a mass of the intermediate layer of food spread on said base layer of food spread substantially inwardly of a peripheral edge of said base layer of food spread, a top food dispenser arrangement that at least partially deposits a mass of the top layer of food spread over said intermediate layer of food spread to substantially at least partially encapsulate said intermediate layer of food spread between said top and base layers of food spread, a second slice dispenser to deposit a second slice of bread on said top layer of food spread, a cutter to substantially cut said first and second bread slices about a cutting surface that is adjacent said sealing surface of said platen, and a pressure plate that at least partially forces said first and second bread slices toward said sealing surface of said platen to form a sealing region between said cut bread slices that is substantially absent said layers of food spread and that has a surface-to-surface seal which is absent fully compressed bread about a periphery of said sandwich, said pressure plate at least partially causing said second slice of bread to recess in said central portion of said platen during the making of said commercial sandwich.

18. The apparatus as defined in claim 17, wherein said top and base layer of food spreads are substantially the same and said intermediate layer of food spread is different from said top and base layer of food spreads.

19. The apparatus as defined in claim 18, wherein said top and base layer of food spreads include nut butter and said intermediate layer of food spread includes jelly.

20. The apparatus as defined in claim 17, wherein said cutter is designed to substantially remove a crust from said first and second bread slices.

21. The apparatus as defined in claim 19, wherein said cutter is designed to substantially remove a crust form said first and second bread slices.

22. The apparatus as defined in claim 17, wherein said pressure plate includes spaced projections to form spaced pressure points in at least one of said bread slices as said first and second bread slices are pressed together.

23. The apparatus as defined in claim 19, wherein said pressure plate includes spaced projections to form spaced pressure points in at least one of said bread slices as said first and second bread slices are pressed together.

24. The apparatus as defined in claim 17, wherein said recessed central portion has a shape of a substantially inverted dome.

25. The apparatus as defined in claim 22, wherein said recessed central portion has a shape of a substantially inverted dome.

26. The apparatus as defined in claim 17, wherein said sealing surface is substantially flat.

27. The apparatus as defined in claim 25, wherein said sealing surface is substantially flat.

28. The apparatus as defined in claim 17, wherein said first food dispenser arrangement includes a device that forms said base layer of food spread having a rim that extends upwardly at least about 0.1 inch to define a central filling receiving receptacle in said base layer of food spread.

29. The apparatus as defined in claim 27, wherein said first food dispenser arrangement includes a device that forms said base layer of food spread having a rim that extends upwardly at least about 0.1 inch to define a central filling receiving receptacle in said base layer of food spread.

30. The apparatus as defined in claim 17, wherein said platen moves to a plurality of locations during the making of said commercial sandwich.

31. The apparatus as defined in claim 29, wherein said platen moves to a plurality of locations during the making of said commercial sandwich.

* * * * *